(12) United States Patent
Iizuka et al.

(10) Patent No.: US 7,864,367 B2
(45) Date of Patent: Jan. 4, 2011

(54) IMAGE PROCESSING SYSTEM AND IMAGE PROCESSING METHOD

(75) Inventors: Shinichi Iizuka, Fukushima (JP); Toshitsugu Yamamoto, Takatsuki (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 702 days.

(21) Appl. No.: 11/899,470

(22) Filed: Sep. 6, 2007

(65) Prior Publication Data

US 2008/0062480 A1    Mar. 13, 2008

(30) Foreign Application Priority Data

Sep. 8, 2006  (JP) ............................. 2006-243529
Jul. 10, 2007  (JP) ............................. 2007-180426

(51) Int. Cl.
    *H04N 1/40*    (2006.01)
(52) U.S. Cl. ..................... 358/1.9; 358/2.1; 358/1.16
(58) Field of Classification Search .................. 358/1.9, 358/2.1, 1.16–1.18, 515, 518–520; 382/166–167, 382/243
See application file for complete search history.

(56) References Cited

U.S. PATENT DOCUMENTS 5,046,119 A    9/1991  Hoffert et al. .................. 382/56
5,463,701 A *  10/1995 Kantner, Jr. et al. .......... 382/166
5,768,481 A *  6/1998  Chan et al. .................... 358/1.2
6,870,637 B1   3/2005  Watanabe ...................... 358/1.9

FOREIGN PATENT DOCUMENTS

| JP | 9-83809 A | 3/1997 |
| JP | 10-51652 A | 2/1998 |
| JP | 2000-165690 A | 6/2000 |

* cited by examiner

*Primary Examiner*—Thomas D Lee
*Assistant Examiner*—Stephen M Brinich
(74) *Attorney, Agent, or Firm*—Sidley Austin LLP

(57) ABSTRACT

A printer divides an input image into a plurality of blocks and extracts a block image corresponding to each of the blocks. The colors of the block image are reduced to, for example, four colors. Index numbers are given to pixels of the color-reduced image, and the four colors are assigned. To a color palette in which color information of the four colors is described in correspondence with the index numbers, object information indicative of the kinds of images (for example, a character, a chart, and a photographic image) is added. Consequently, the handling performance of object information for use in an image processing such as a color conversion process is improved.

13 Claims, 8 Drawing Sheets

| INDEX NUMBER | | C, | M, | Y, | K, | OBJECT |
|---|---|---|---|---|---|---|
| 00 |  | ( 235, | 217, | 8, | 28, | 01) |
| 01 |  | ( 8, | 115, | 64, | 5, | 10) |
| 10 |  | ( 23, | 184, | 128, | 8, | 10) |
| 11 |  | ( 3, | 31, | 13, | 3, | 10) |

FIG. 8

IMAGE PROCESSING SYSTEM AND IMAGE PROCESSING METHOD

This application is based on application Nos. 2006-243529 and 2007-180426 filed in Japan, the contents of which are hereby incorporated by reference.

BACKGROUND OF THE INVENTION

1. Field of the Invention

The present invention relates to an image processing technique for performing an image processing on an input image.

2. Description of the Background Art

To address demands for improvement in image quality in recent years, generally, an image processing apparatus such as a printer performs an image processing dedicated to each of the kinds of images for the reason that requirements for optimum image quality vary among the kinds of images.

In order to perform a process dedicated to each of the kinds of images, for example, information of an object expressing the kind of an image (such as a character, a chart, a photographic image, or the like) is added to an image (refer to, for example, Japanese Patent Application Laid-Open Nos. 2000-165690 and 10-51652(1998)). The object information (image processing information) is recorded using, for example, two bits per pixel in a layer formed separately from the image data.

The object information, however, is managed separately from the image data so that the handling performance is not good. For example, when image data is rotated, edition (rotating process) for the object information in correspondence with the rotation of the image data is necessary, and the process is complicated.

SUMMARY OF THE INVENTION

The present invention is directed to an image processing system for performing an image processing on an input image.

According to the present invention, the image processing system includes: (a) an extracting unit that divides the input image into a plurality of regions and extracts a region image corresponding to each of the plurality of regions; (b) a color reduction unit that performs a process of reducing colors of the region image to a predetermined number of colors less than number of pixels making up the region image and assigns each color concerning the predetermined number of colors to each pixel of the region image; and (c) a generating unit that generates a composite information table obtained by combining color information of the each color concerning the predetermined number of colors and image processing information for use in a predetermined image processing performed on said each color. With the configuration, the handling performance of the image processing information added to an image can be improved.

In a preferred embodiment of the invention, in the image processing system, the image processing information includes information concerning a color conversion process. Therefore, by performing the color conversion process on the color unit basis, a prompt process can be realized.

The present invention is also directed to an image processing method.

Therefore, an object of the present invention is to provide an image processing technique realizing improved handling performance of image processing information added to an image for use in an image processing.

These and other objects, features, aspects and advantages of the present invention will become more apparent from the following detailed description of the present invention when taken in conjunction with the accompanying drawings.

DESCRIPTION OF THE PREFERRED EMBODIMENTS

Configuration of Image Processing System

Figure 1:
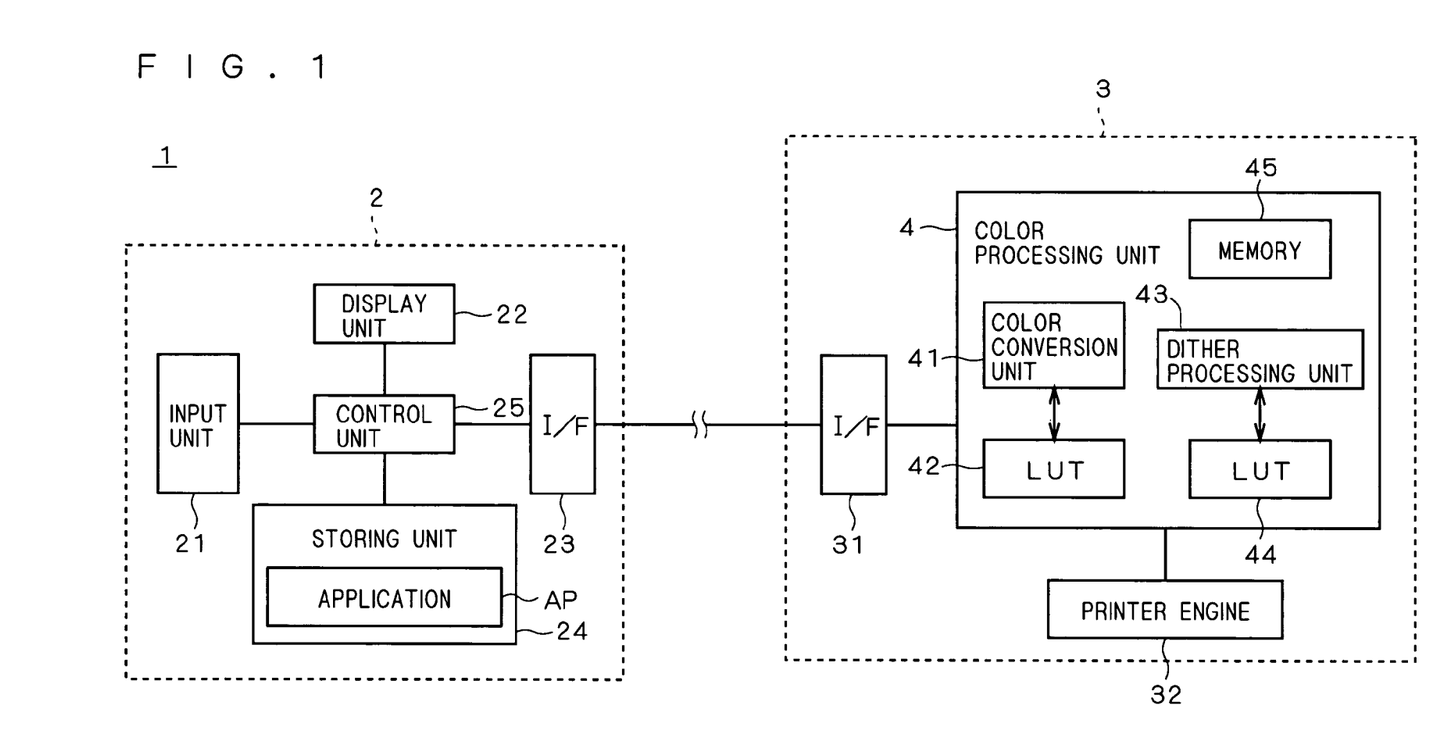
FIG. 1 is a block diagram showing main components of an image processing system as an embodiment of the present invention.

FIG. 1 is a block diagram showing main components of an image processing system 1 as an embodiment of the present invention.

The image processing system 1 has a personal computer 2 and a printer 3 connected to the personal computer 2 so that data can be transmitted.

The personal computer 2 has an input unit 21 including a mouse and a keyboard, a display unit 22 such as a liquid crystal display, and an interface (I/F) 23 for transmitting print data described in, for example, a page description language to the printer 3 and, in addition, has a storing unit 24 and a control unit 25.

The storing unit 24 is, for example, a hard disk drive storing an application (such as software having a word processor function) AP capable of inputting and editing characters, images, and the like and outputting the processed data to the printer 3.

The control unit 25 has, for example, a CPU and a memory and is a part for controlling the components of the personal computer 2 in a centralized manner.

The printer 3 is, for example, a page printer and has a color processing unit 4 for performing a color process on print data received from the personal computer 2 via an interface (I/F) 31. The data processed by the color processing unit 4 is supplied to a printer engine 32 and printed onto a sheet (paper medium).

The color processing unit 4 has a color conversion unit 41 for converting RGB (Red, Green, and Blue) tone image data as print data supplied from the personal computer 2 to CMYK (Cyan, Magenta, Yellow, and Black) tone image data, a dither processing unit 43 for performing a halftone process (screen process) on the CMYK tone image data generated by the color conversion unit 41, and a memory 45 for temporarily storing image data.

The color conversion unit 41 selects proper one among a plurality of conversion tables (color conversion tables) for performing a color conversion process held in a lookup table (LUT) unit 42 on the basis of object information indicative of the kind of an image (such as a character, chart, a photographic image, or the like), and performs a color conversion process of converting an RGB color image to a CMYK color image on the basis of the selected color conversion table.

The dither processing unit 43 selects a proper one among a plurality of conversion tables (dither process tables) for performing a dither process held in a lookup table (LUT) unit 44 on the basis of object information attached to the image, and performs a dither process.

In the following, the processes in the color processing unit 4 will be described in detail.

Processes in Color Processing Unit 4

In the color processing unit 4, a color image of one page supplied from the personal computer 2 to the printer 3 is divided into a plurality of blocks (areas), images corresponding to the divided blocks (in the following, also called "block images") are sequentially extracted, and a color reduction process for a block image is performed to reduce the number of colors smaller than the number of pixels of the block image. The color reduction process will be concretely described.

Figure 2:
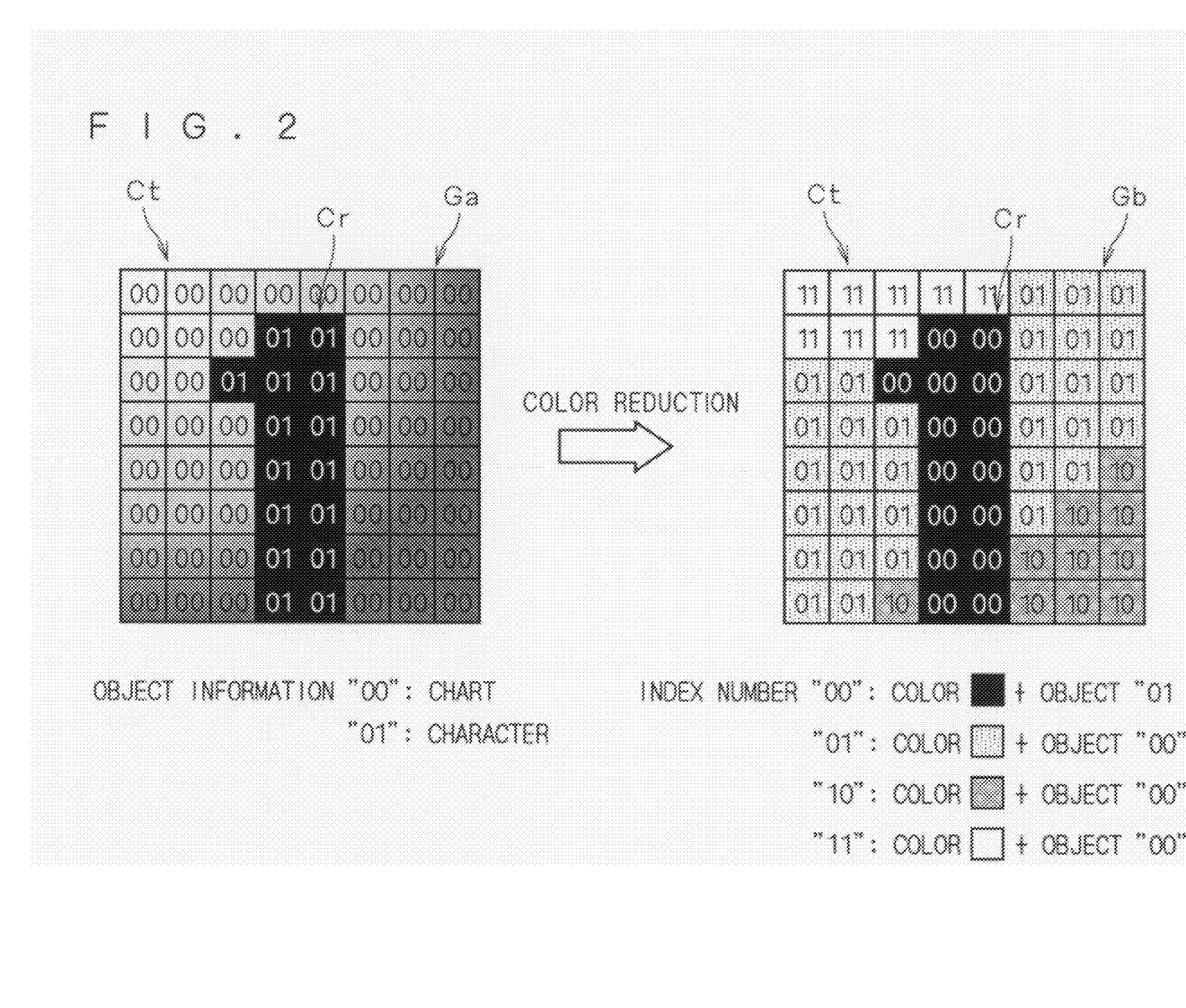
FIG. 2 is a diagram illustrating a color reduction process in a color processing unit.

FIG. 2 is a diagram showing the color reduction process in the color processing unit 4. Images Ga and Gb in FIG. 2 correspond to the block images (area images) which are color images each made of 8×8 pixels.

The print data of the block image Ga into which image sent from the personal computer 2 is divided includes color data of each pixel of the image Ga and object information (shown by numeric characters "00" and "01") given to the each pixel. The image Ga is shown in FIG. 2 as an image integrated with object information. In reality, the object information is managed as data separate from image.

The image Ga is divided into a "character" part Cr consisting of pixels in which the object information is "01", and a "chart" part Ct consisting of pixels in which the object information is "00". A single color (for example, black) is given to the "character" part Cr, and gradation of color is given to the "chart" part Ct.

The color processing unit 4 performs a process of reducing the number of colors to four colors on the image Ga, thereby generating the image Gb in which any one of the four colors is given as index number ("00", "01", "10", or "11") to each pixel of the image. Concretely, four representative colors (for example, one color of the character part Cr and three colors of the chart part Ct) in the image Ga are determined, and the image Gb to which the four colors are given is generated. At the time of performing the color reduction process, a color palette in which color information of the resultant four colors is described is generated.

The color processing unit 4 pays attention to the point that the relationship between the color (information) given to each pixel and the object information is strong and adds the object information to the color palette. That is, the color processing unit 4 generates the color palette (composite information table) in which the color information of the resultant four colors and object information (image processing information) used for a color conversion process and the like performed on the color unit basis is combined. With such a color palette, the handling performance of the object information can be improved.

In the case where a color given by the color reduction process and an object do not correspond to each other one to one, that is, in the case where a pixel group to which the same color is given includes a plurality of objects (for example, "character" and "chart"), the object having the largest number of pixels may be used as a representative object. Alternatively, by dividing an image on the object unit basis while suppressing division by colors, the total number of dividing the image may be set to a predetermined number (for example, four).

As described above, by adding object information to the color palette, the data size of the print data of an image can be effectively reduced. The effect will be described by using a concrete example.

For example, in the case of dividing an original image having 256 shades of gray of R, G, and B into blocks each made of 12×12 pixels, the size of print data of each block is total 3,744 bits in which the size of the image information is 12×12×8×3 bits, and the size of the object information is 12×12×2 bits.

On the other hand, the size of print data of an image obtained by reducing the colors to four colors and adding object information to the color palette is total 392 bits in which the size of the color palette part is 4×(8×3+2) bits and the size of the index number part is 12×12×2 bits.

By the color reduction process of adding object information to the color palette, the data size is reduced to about ⅒. The data amount can be reduced largely.

Particularly, attention is paid only to the object information. The size of the object information in the original image is 288 (=12×12×2) bits and, on the other hand, the size of the object information after the color reduction process is 8 (=4× 2) bits. Thus, the data amount can be reduced to ¹⁄₃₆.

The image subjected to the color reduction process undergoes a color conversion process and a halftone process according to the kinds of images ("character", "chart", and "photographic image") as shown in the following table on the basis of the object information in the color conversion unit 41 and the dither processing unit 43 in the color processing unit 4.

TABLE

|  | Characteristic to which importance is placed in color conversion | Characteristic to which importance is placed in halftone process |
| --- | --- | --- |
| Character | Sharpness | Resolution |
| Chart | Natural color reproduction | Resolution |
| Photographic image | Natural color reproduction | Tone |

In the color converting unit 41, in the case where the object is "character", the color conversion placing importance on "sharpness" is performed. In the case where the object is "chart" or "photographic image", the color conversion placing importance on "natural color reproduction" is performed. In these cases, two kinds of color conversion tables (a table placing importance on "sharpness" and a table placing importance on "natural color reproduction") are held in the LUT unit 42. By switching the color conversion tables, the color correction process according to the kind of an image is performed.

In the dither processing unit 43, in the case where the object is a "character" or "chart", the halftone process placing importance on "resolution" is performed. On the other hand, when the object is a "photographic image", the halftone process placing importance on "tone" is performed. In these cases, two kinds of dither process tables (a table placing importance on "resolution" and a table placing importance on "tone") are held in the LUT unit 44. By switching the dither process tables, the dither process according to the kind of an image is performed.

Since the color conversion unit 41 and the dither processing unit 43 can use the object information assembled in the color palette and whose handling performance is improved, the process can be performed smoothly. Since the color conversion unit 41 can perform color conversion based on the object information linked with the colors in the color palette, in the case of performing the color conversion by the number of colors in the color palette, it is sufficient to perform the color conversion by the number of times equal to the number of colors in each block image. For example, in the case of reducing the number of colors to four, it is sufficient to perform the color conversion four times. Thus, the color converting process can be performed promptly.

The process of rotating an image (hereinbelow, also called "color-reduced image") of one page subjected to the color reduction process in the color processing unit 4 will be described.

The color-reduced image rotating process is performed by, for example, changing the order of accessing a data sequence of the color-reduced image generated by the color conversion process in the color conversion unit 41. The data sequence of the color-reduced image is constructed as a sequence of data having equal data length every block image of 8×8 pixels (hereinbelow, also called "block data") by the color reduction process in the color processing unit 4. Therefore, block data corresponding to block images in the data sequence of the color-reduced image can be easily accessed at random. The color-reduced image rotating process having such a characteristic will be described in detail hereinbelow.

Figure 3:
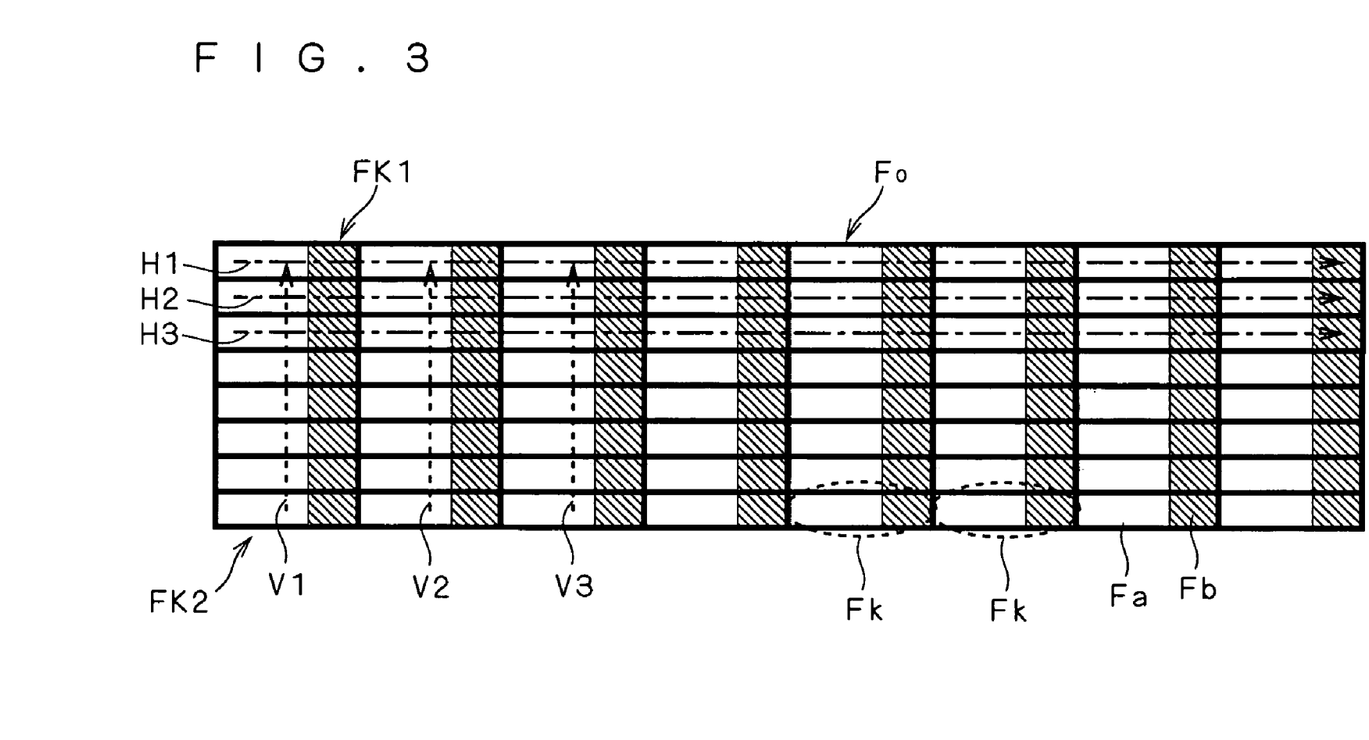
FIGS. 3 and 4 are a diagram illustrating a process of rotating a color-reduced image.
Figure 4:
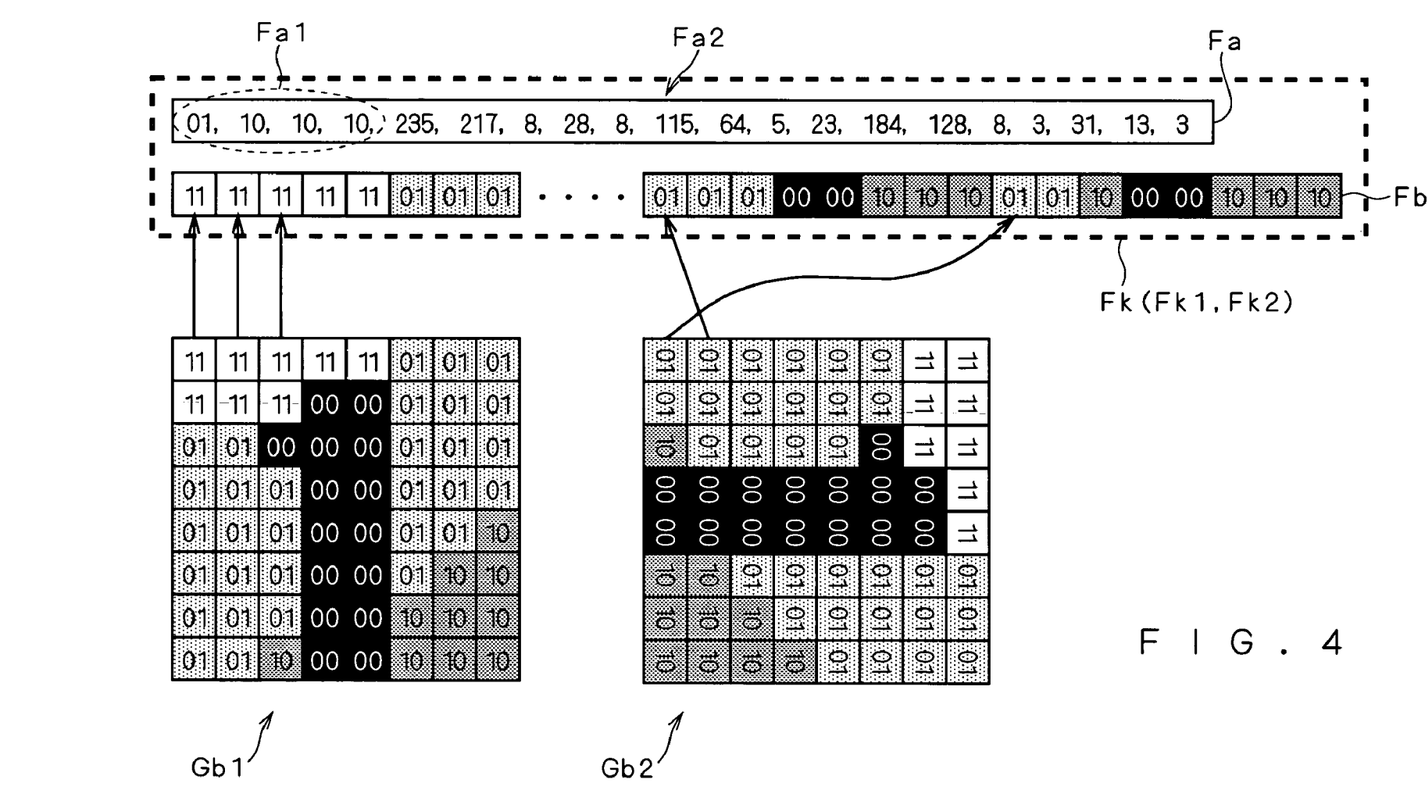

FIGS. 3 and 4 are diagrams illustrating the color-reduced image rotating process.

As shown in FIG. 3, image data Fo of a color-reduced image is constructed by sequences of block data Fk. Each of the block data Fk is constructed by information Fa of a color palette (hereinbelow, also called "color palette data") in which object information is assembled by the color reduction process, and information Fb of an index number (hereinbelow, also called "index data" and is hatched in the diagram) given to each of pixels of a block image by the color reduction process.

Figure 5:
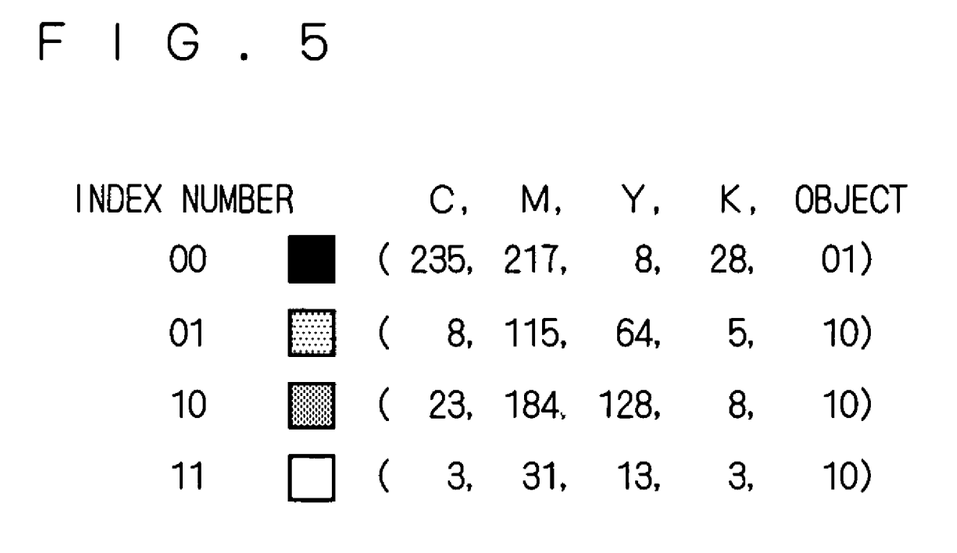
FIG. 5 is a diagram showing an example of color information and object information linked with an index number.

In the color pallet data Fa, for example, in the case where the color information of 256 shades of gray of CMYK and object information as shown in FIG. 5 is associated with four kinds of index numbers assigned to the pixels like the block image Gb (FIG. 2), color information Fa2 of 256 shades of gray is disposed after object information Fa1 expressed by "01, 10, 10, 10" (in binary notation) as shown in FIG. 4. On the other hand, in the index data Fb subsequent to the color palette data Fa, four kinds of index numbers (in binary notation) given to the pixels of the block image Gb (FIG. 2) are arranged in the order of a pixel sequence of the block image Gb.

In the case of performing the dither process accompanying a rotation of the image data Fo having the data sequences, the order of reading the pixels forming the color-reduced image has to be changed. In other words, the order of reading information given to the pixels (hereinbelow, also called "pixel information") of the image data Fo has to be changed. In the following, the order of reading pixel information in the case where the image rotating process is not accompanied and the order of reading pixel information in the case where the image rotating process is accompanied will be described with reference to FIGS. 3 and 4.

(1) Reading Order of Pixel Information in the Case where Image Rotating Process is not Accompanied In reading of pixel information in the case where the image rotating process is not accompanied, the reading order of the block data Fk of a block image made of 8×8 pixels and the reading order of the pixel information in the block data Fk are determined in advance.

With respect to the reading order of the block data Fk, the block data Fk is read from top to bottom of the image data Fo line by line and from left to right in each line. Concretely, first, the block data Fk in the first line is read from the block data Fk1 at the left upper corner of the image data Fo to right as shown by an arrow H1 shown in FIG. 3. When the block data is read to the right end and reading of the first line is finished, the block data Bk in the second line below the first line is sequentially read as shown by an arrow H2. After completion of reading of the second line, the third line below the second line is read as shown by an arrow H3. By repeating the reading of the block data Bk to the right end of the lowest line, the block data Bk in the image data Fo can be read properly in order.

The reading order of the pixel information in each of the block data Bk will be described concretely hereinbelow using, as an example, reading of pixel information of the block data Fk1 positioned at the left upper corner of the image data Fo in FIG. 3. It is assumed that as the block data Fk1, data corresponding to the block image Gb shown in FIG. 2 is described.

Since reading of the pixel information in the block data Fk1 does not accompany the image rotating process, the pixel information is read so as to form a block image Gb1 (FIG. 4) having the same pixel arrangement as that of the block image Gb in FIG. 2. Specifically, each index number of the pixels described in the index data Fb is obtained in order from the head, and pixel information in the color palette data Fa corresponding to the each index number obtained is accessed. To be concrete, the index number "11" of the first pixel in the index data Fb is obtained, and the pixel information in the color pallet data Fa corresponding to the index number "11", that is, binary number "10" in the object information Fa1 and CMYK value "3, 31, 13, 3" in the color information Fa2 are read. On the basis of the pixel information which is read in such a manner, a dither process table corresponding to the object information "01" is selected by the LUT unit 44, and a dither process on the CMYK value "3, 31, 13, 3" is performed with the selected dither process table. After that, the index number "11" of the second pixel in the index data Fb, the index number "11" of the third pixel, "11", . . . are obtained in order, and a dither process similar to that on the first pixel is repeated on the basis of the pixel information of the color palette data Fa corresponding to each of the index numbers. The repeating process is performed until the process of all pixels of the block image Gb1 is completed.

The dither process on the block data Fk in the reading order of the pixel information is performed in order on each block data Fk in accordance with the above-described reading order of the block data Fk, and the dither process which does not accompany rotating of an image is finished.

(2) Reading Order of Pixel Information in the Case where Image Rotating Process is Accompanied In reading of pixel information in the case where the image rotating process is accompanied, the reading order of the block data Fk and the reading order of the pixel information in the block data Fk different from that in the case where the rotating process is not accompanied are determined in advance.

With respect to the reading order of the block data Fk in the case of rotating an image clockwise only by 90 degrees, the block data Fk is read from left to right row by row and from bottom to top in each row. Concretely, first, as shown by an arrow V1 in FIG. 3, the block data Fk in the first row is read upward from the block data Fk2 at the left lower corner of the image data Fo. When the block data is read to the upper end and reading of the first row is finished, the block data Bk in the second row on the right side of the first row is sequentially read as shown by an arrow V2. After completion of reading of the second row, the third row on the right side of the second row is read as shown by an arrow V3. By repeating the reading of the block data Bk to the upper end of the row at the right end, the block data Bk in the image data Fo can be read properly in order.

The reading order of the pixel information in each of the block data Bk will be described concretely hereinbelow using, as an example, reading of pixel information of the block data Fk2 positioned at the left lower corner of the image data Fo in FIG. 3. It is assumed that as the block data Fk2, data corresponding to the image Gb shown in FIG. 2 is described.

Since reading of the pixel information in the block data Fk2 accompanies rotation of the image of 90 degrees in the clockwise direction, the pixel information is read so as to form a block image Gb2 (FIG. 4) having a pixel arrangement obtained by clockwisely rotating the pixel arrangement of the block image Gb in FIG. 2 only by 90 degrees. Specifically, each index number of the pixels described in the index data Fb is obtained in accordance with the pixel arrangement order of the block image Gb2, and pixel information in the color palette data Fa corresponding to the each index number obtained is accessed. To be concrete, the index number "01" of the eighth pixel from the end of the data sequence in the index data Fb is obtained, and the pixel information in the color pallet data Fa corresponding to the index number "01", that is, binary number "10" in the object information Fa1 and CMYK value "8, 115, 64, 5" in the color information Fa2 are read. On the basis of the pixel information which is read in such a manner, a dither process table corresponding to the object information "10" is selected by the LUT unit 44, and a dither process on the CMYK value "8, 115, 64, 5" is performed with the selected dither process table. After that, the index number "01" of the 16th pixel from the end of the data sequence in the index data Fb and the subsequent index numbers are obtained in order, and a dither process similar to that on the pixel processed first is repeated on the basis of the pixel information of the color palette data Fa corresponding to each of the index numbers. The repeating process is performed until the process of all pixels of the block image Gb2 is completed.

The dither process on the block data Fk in the reading order of the pixel information is performed in order on each block data Fk in accordance with the above-described reading order of the block data Fk, and the dither process accompanying clockwise rotation of an image by 90 degrees is finished.

The image rotating process is not limited to the 90-degree clockwise rotation. An image may be rotated by other degrees (for example, 180 degrees or 270 degrees in the clockwise direction). In this case as well, a pixel information reading operation corresponding to reading of pixel information in the case accompanying the clockwise rotation of 90 degrees is performed.

Operation of Image Processing System

Figure 6:
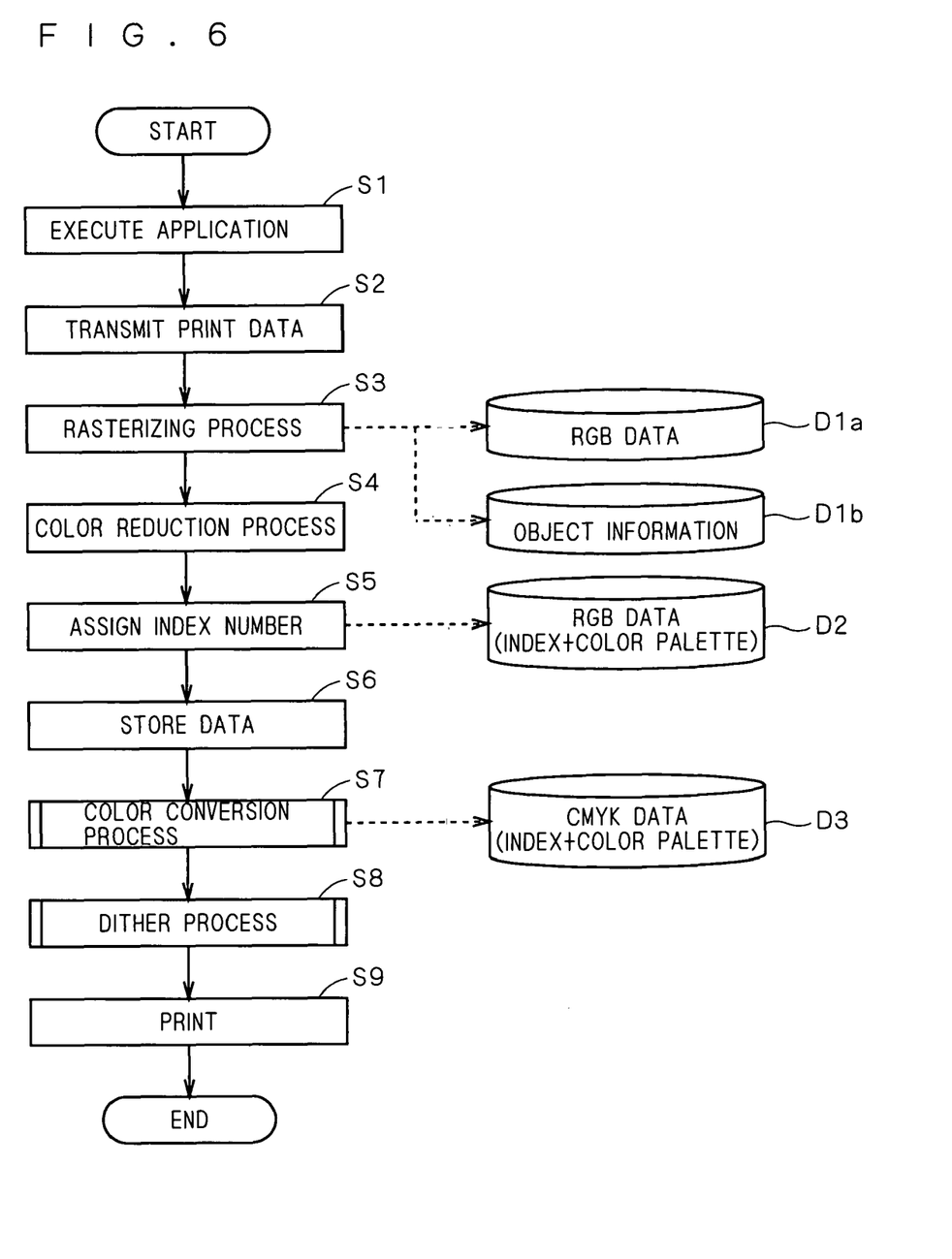
FIG. 6 is a flowchart showing basic operation of the image processing system.

FIG. 6 is a flowchart showing basic operation of the image processing system 1.

For example, the user operates the input unit 21 of the personal computer 2 to execute the application AP in the storing unit 24, and a print instruction is given to make the printer 3 print an image of each page generated (entered) by the user on the application AP (step S1).

In step S2, the print data of the image in the each page is transmitted to the printer 3. In this case, print data obtained by converting the image data generated by the application AP to data for the printer 3 in the printer driver is transmitted to the printer 3.

In step S3, the print data transmitted from the personal computer 2 in step S2 is received by the printer 3, and a process of rasterizing the print data is performed. By the rasterizing process, data D1a of an RGB color image (hereinbelow, also simply called "RGB data") and object information D1b of the page are generated.

In step S4, the RGB data D1a generated in step S3 is divided into a plurality of blocks, and a color reduction process is performed on the block unit basis. For example, the number of colors is reduced to four colors like in the image Gb of FIG. 2, and the object information obtained by referring to the object information D1b is added to a color palette.

In step S5, index number is given to each of the pixels constructing the image subjected to the color reduction process in step S4. For example, the index number "00", "01", "10", or "11" corresponding to the four colors like in the image Gb of FIG. 2 is assigned to each pixel of the image Gb.

By the operation in step S5, the RGB data D2 with the index numbers and the color palette is generated.

In step S6, the RGB data D2 generated in step S5 is stored in the memory 45 of the color processing unit 4.

In step S7, the color conversion process is performed by the color conversion unit 41 on the RGB data D2, thereby generating data D3 of a CMYK color image (hereinbelow, also called "CMYK data" which will be described in detail later).

In step S8, the dither processing unit 43 performs a dither process on the CMYK data D3 generated in step S7 (which will be described in detail later).

In step S9, the data subjected to the dither process in step S8 is transferred to the printer engine 32 and printed on a sheet (paper medium).

Figure 7:
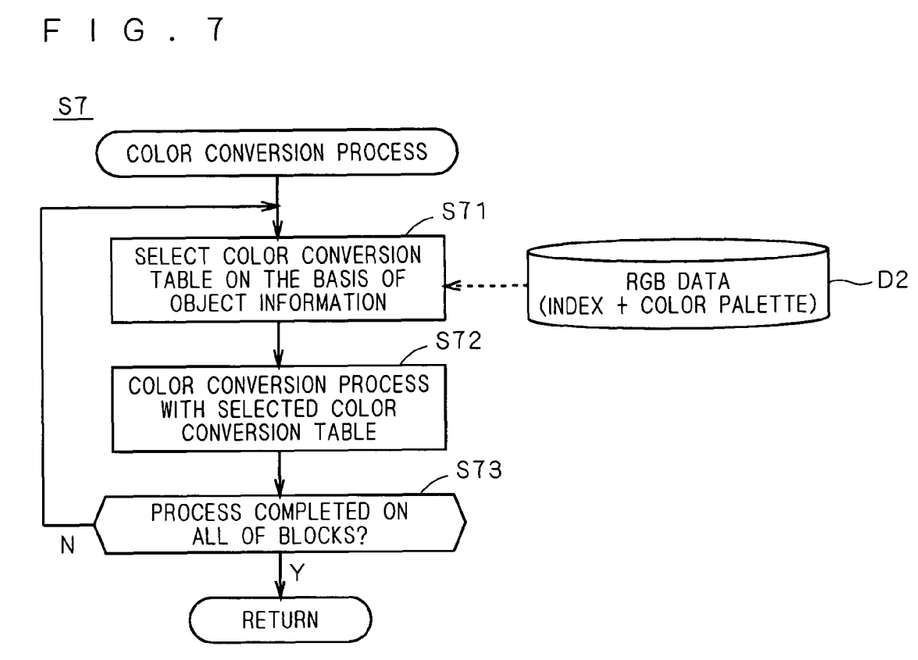
FIG. 7 is a flowchart showing color conversion process performed by a color conversion unit.

FIG. 7 is a flowchart corresponding to the step S7 and showing the color converting process in the color converting unit 41.

In step S71, on the basis of the object information read from the color palette of the RGB data D2 generated in step S5, one of a plurality of color conversion tables held in the LUT unit 42 is selected.

In step S72, the color conversion process with the color conversion table selected in step S71 is performed on the block image. When the color conversion process is performed by the number of times equal to the number of colors described in the color palette, the color conversion on the block image is completed. The number of times of color conversion can be reduced as compared with that in the conventional technique.

In step S73, whether the color conversion process has been completed on all of division blocks or not is determined. When the color conversion process is completed, the color conversion unit 41 advances to step S8. When the process has not been completed, the color conversion unit 41 returns to step S71 and starts the color conversion process on the next division block.

Figure 8:
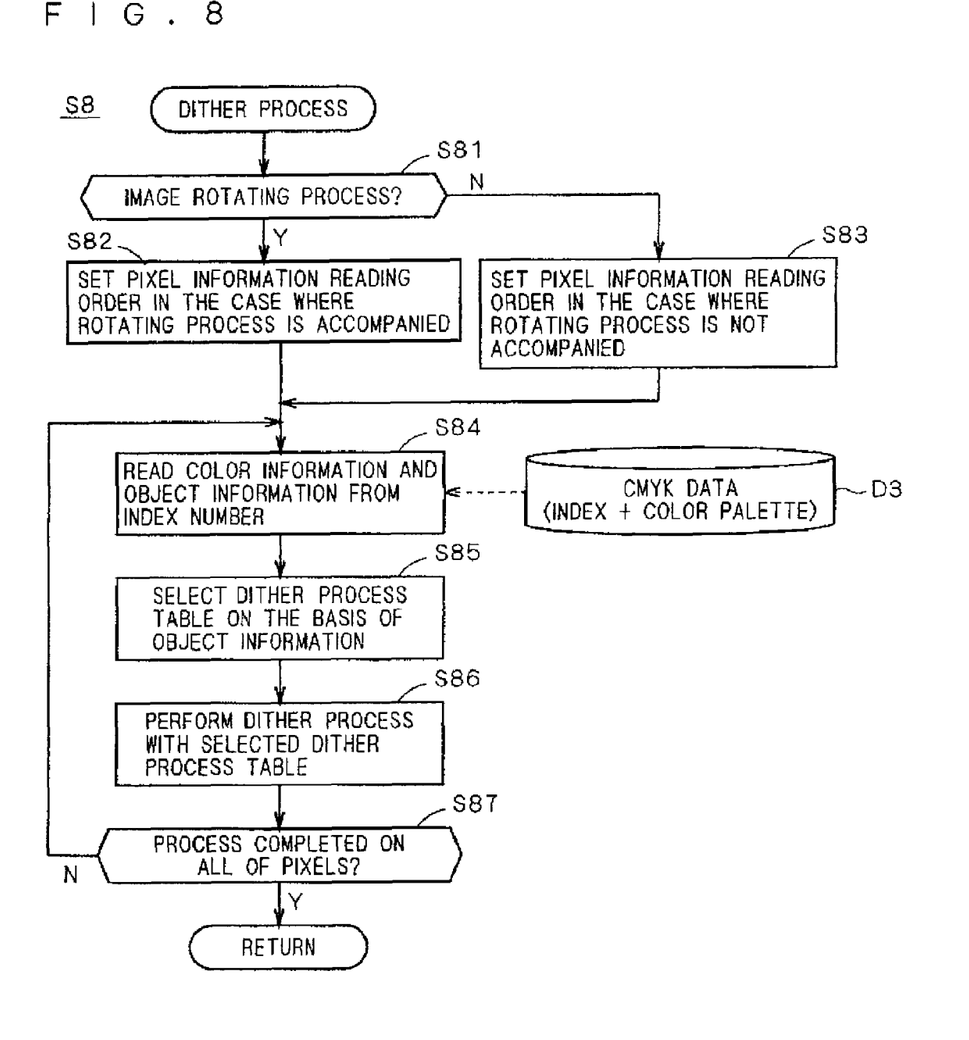
FIG. 8 is a flowchart showing a dither process performed by a dither processing unit.

FIG. 8 is a flowchart corresponding to the step S8 and showing the dithering process in the dither processing unit 43.

In step S81, whether the image rotating process is performed or not is determined. For example, on the basis of the printing direction and the like in the printer 3 designated from the personal computer 2, whether a color-reduced image is rotated or not is determined. In the case of performing the rotating process, the dither processing unit 43 advances to step S82. When the rotating process is not performed, the dither processing unit 43 advances to step S83.

In step S82, the order of reading the pixel information in the case where the image rotating process is accompanied is set. To be concrete, the pixel information reading order described in (2) is set.

In step S83, the order of reading the pixel information in the case where the image rotating process is not accompanied is set. Concretely, the pixel information reading order described in (1) is set.

In step S84, referring to the CMYK data D3 generated in step S7, the color information and the object information are read on the basis of the index number given to a pixel to be subjected to the dither process. In this case, the information used for the dither process is read according to the reading order set in step S82 or S83.

In step S85, on the basis of the object information read in step S84, one dither process table is selected from a plurality of dither process tables held in the LUT unit 44.

In step S86, the dither process with the dither process table selected in step S85 is performed on the pixel to be processed. Since the process based on the object information with improved handling performance which is assembled in the color palette can be performed, the dither process can be performed smoothly.

In step S87, whether the dither process has been completed on all of pixels or not is determined. In the case where the dither process is completed, the dither processing unit 43 advances to step S9. When the dither process is not completed, the dither processing unit 43 returns to step S81 and starts the dither process on the next pixel.

By the operation of the image processing system 1, object information is added to the color palette in which color information of the colors reduced is described. Therefore, handling performance of the object information improves and the data size of the object information can be reduced.

Modification

In the foregoing embodiment, adding the object information indicative of the kinds of images such as "character" and "chart" to the color palette is not essential. Alternatively, a parameter to be used in the following image processing may be added. For example, numerical information as a key to the following image processing such as dispersion of colors before the color reduction may be added to the color palette.

While the invention has been shown and described in detail, the foregoing description is in all aspects illustrative and not restrictive. It is therefore understood that numerous modifications and variations can be devised without departing from the scope of the invention.

What is claimed is:

1. An image processing system for performing an image processing on an input image, comprising:
    (a) an extracting unit that divides said input image into a plurality of regions and extracts a region image corresponding to each of said plurality of regions;
    (b) a color reduction unit that performs a process of reducing colors of said region image to a predetermined number of colors less than a number of pixels making up said region image and assigns a color from said predetermined number of colors to each pixel of said region image; and
    (c) a generating unit that generates a composite information table obtained by combining color information of said each color from said predetermined number of colors and image processing information for use in a predetermined image processing performed on said each color.

2. The image processing system according to claim 1, wherein said image processing information includes information concerning a color conversion process.

3. The image processing system according to claim 2, further comprising:
    (d) a unit that holds a plurality of conversion tables for performing said color conversion process; and
    (e) a color conversion unit that selects one conversion table of said plurality of conversion tables on the basis of said image processing information and performs a color conversion process based on said one conversion table.

4. The image processing system according to claim 1, wherein said image processing information includes information concerning a dither process.

5. The image processing system according to claim 1, further comprising:
    (f) a reading unit that reads said image processing information from said composite information table; and
    (g) an image processing unit that performs said predetermined image processing on the basis of said image processing information read by said reading unit.

6. An image processing system for performing an image processing on an input image, comprising:
    (a) a reading unit that reads image processing information for use in a predetermined image processing performed on said input image from a predetermined composite information table, said predetermined composite information table, at the time of reducing colors of a region image extracted by dividing said input image into a plurality of regions to a predetermined number of colors less than number of pixels making up said region image and assigning a color from said predetermined number of colors to each pixel of said region image, being generated by combining color information of said each color from said predetermined number of colors and said image processing information used in an image processing performed on said each color; and
    (b) an image processing unit for performing said predetermined image processing on the basis of said image processing information read by said reading unit.

7. The image processing system according to claim 6, wherein said predetermined image processing includes a process of color conversion from an RGB color image to a CMYK color image.

8. The image processing system according to claim 6, wherein said predetermined image processing includes a color correction process.

9. The image processing system according to claim 6, wherein said predetermined image processing includes a dither process.

10. The image processing system according to claim 6, wherein said image processing unit performs an image rotation process.

11. An image processing method for performing an image processing on an input image, comprising the steps of:
    (a) dividing said input image into a plurality of regions and extracting a region image corresponding to each of said plurality of regions;
    (b) performing a process of reducing colors of said region image to a predetermined number of colors less than number of pixels making up said region image and assigning a color from said predetermined number of colors to each pixel of said region image; and
    (c) generating a composite information table obtained by combining color information of said each color from said predetermined number of colors and image processing information for use in a predetermined image processing performed on said each color.

12. An image processing method for performing an image processing on an input image, comprising the steps of:
(a) reading image processing information for use in a predetermined image processing performed on said input image from a predetermined composite information table, said predetermined composite information table, at the time of reducing colors of a region image extracted by dividing said input image into a plurality of regions to a predetermined number of colors less than number of pixels making up said region image and assigning a color from said predetermined number of colors to each pixel of said region image, being generated by combining color information of said each color from said predetermined number of colors and said image processing information used in an image processing performed on said each color; and
(b) performing said predetermined image processing on the basis of said image processing information read in said step (a).

13. The image processing method according to claim 12, wherein an image rotation process is performed in said step (b).

* * * * *